(12) United States Patent
Panza

(10) Patent No.: US 9,139,431 B2
(45) Date of Patent: Sep. 22, 2015

(54) PROCESS AND EQUIPMENT FOR THE PRODUCTION OF AMMONIA MAKE-UP SYNGAS WITH AN AIR SEPARATION UNIT AS NITROGEN SOURCE

(75) Inventor: Sergio Panza, Como (IT)

(73) Assignee: Casale SA (CH)

( * ) Notice: Subject to any disclaimer, the term of this patent is extended or adjusted under 35 U.S.C. 154(b) by 1039 days.

(21) Appl. No.: 13/140,230

(22) PCT Filed: Oct. 9, 2009

(86) PCT No.: PCT/EP2009/063193
§ 371 (c)(1),
(2), (4) Date: Aug. 26, 2011

(87) PCT Pub. No.: WO2010/069626
PCT Pub. Date: Jun. 24, 2010

(65) Prior Publication Data
US 2011/0297886 A1  Dec. 8, 2011

(30) Foreign Application Priority Data

Dec. 18, 2008  (EP) ..................... 08021962

(51) Int. Cl.
*C01B 3/02* (2006.01)
*C01B 3/38* (2006.01)
*C01B 3/48* (2006.01)

(52) U.S. Cl.
CPC . *C01B 3/025* (2013.01); *C01B 3/38* (2013.01); *C01B 3/382* (2013.01); *C01B 3/48* (2013.01); *C01B 2203/0233* (2013.01); *C01B 2203/0244* (2013.01); *C01B 2203/0283* (2013.01); *C01B 2203/068* (2013.01); *C01B 2203/1235* (2013.01); *C01B 2203/141* (2013.01); *Y10T 29/49718* (2015.01)

(58) Field of Classification Search
CPC ............ C01C 1/04; C01B 3/025; C01B 3/38; C01B 3/382; C01B 3/48
USPC .......... 252/376, 370, 373, 374, 375; 422/187, 422/148; 423/359, 360, 219, 246, 248
See application file for complete search history.

(56) References Cited

U.S. PATENT DOCUMENTS 5,736,116 A * 4/1998 LeBlanc et al. ............... 423/359
2001/0006615 A1 * 7/2001 Badano ........................ 423/358

FOREIGN PATENT DOCUMENTS

DE   3047257 A1   7/1982
DE   3630311 A1   3/1988
DE   4334257 A1   4/1995

OTHER PUBLICATIONS

Max Appl, "Ammonia", Ullmann's Encyclopedia of Industrial Chemislry, Dec. 15, 2006, pp. 1-155, XP-002529397.*
Max Appl, "Ammonia", Ullmann's Encyclopedia of Industrial Chemistry, Dec. 15, 2006, pp. 1-155, XP-002529397.
International Preliminary Report on Patentability issued in connection with PCT Application No. PCT/EP2009/063193.

* cited by examiner

*Primary Examiner* — Colleen Dunn
(74) *Attorney, Agent, or Firm* — Akerman LLP

(57) ABSTRACT

A process and a plant for producing a makeup synthesis gas (6) for the synthesis of ammonia where a hydrocarbon feedstock is reformed in a primary reformer (10) and in an autothermal reformer (14) in parallel with said primary reformer; nitrogen is furnished by an air separation unit (13), and $O_2$-enhched air (8) produced in said air separation unit is fed to the autothermal reformer. A method for the revamping of the front-end of an ammonia plant is also disclosed.

6 Claims, 2 Drawing Sheets

PROCESS AND EQUIPMENT FOR THE PRODUCTION OF AMMONIA MAKE-UP SYNGAS WITH AN AIR SEPARATION UNIT AS NITROGEN SOURCE

FIELD OF THE INVENTION

The present invention relates to a process and the related equipment for the production of ammonia make-up syngas.

PRIOR ART

Ammonia synthesis plants have usually a front-end section where a hydrocarbon feedstock, for example natural gas, is converted into an appropriate make-up synthesis gas containing hydrogen and nitrogen in a 3:1 molar ratio, for the synthesis of ammonia. The term of ammonia make-up syngas is used in this specification with reference to a synthesis gas obtained from the reforming of a hydrocarbon feedstock, and adapted to feed an ammonia synthesis section.

In a known process, the makeup syngas is produced with the following main steps: the hydrocarbon is reacted with water steam in a primary reformer, obtaining a syngas containing $H_2$, steam, residual hydrocarbons, CO and $CO_2$; said syngas is treated in a shift reactor converting the CO into $CO_2$; the $CO_2$ is then removed in a suitable unit downstream the shift reactor, for example a PSA (pressure swing absorption) device; the purified syngas at the output of the PSA device is mixed with a nitrogen stream furnished by an air separation unit (ASU), to adjust the molar ratio between $H_2$ and $N_2$.

FIG. 2 is an example of a prior-art layout of the front-end of an ammonia synthesis plant comprising: a primary reformer 210; a shift and gas cooling unit 211, a PSA device 212 for the removal of the $CO_2$, and an air separation unit 213. The front-end feeds an ammonia synthesis loop 214.

A natural gas flow 201 is partially oxidated with water steam in the primary reformer 210, obtaining a stream 202 which is treated in the unit 211, shifting the carbon monoxide into carbon dioxide, and in the PSA unit 212 fed with the cooled output stream 203 from the unit 211. The output 204 of the PSA unit receives a pure (>99.8%) nitrogen flow 205 produced in the ASU unit 213, so that the resulting stream 206 contains hydrogen and nitrogen in the required 3:1 molar ratio, with negligible impurities such as unconverted methane or inerts, thus being adapted to react in the loop 214. The product of the loop 214 is a stream 207 of ammonia ($NH_3$).

The scope of the ASU unit 213 is basically to furnish the required amount of nitrogen, in the example by means of the stream 205. Another product of the ASU unit is a stream of oxygen-enriched air, in the example the stream 208, which in the prior art is usually vented to atmosphere or, in some cases, used as combustible in the primary reformer. Said enriched air 208 has an oxygen content generally in the range of 50-75%, but a higher (up to 99.9% of Oxygen) or lower content is possible.

There is an effort to improve the production rate of the process, and in particular the ability to convert the hydrocarbon feedstock into ammonia make-up syngas, in relation with the size of the primary reformer and downstream equipments such as the gas-shifting and $CO_2$-removal devices, and the gas coolers. In particular, the experience shows that a substantial bottleneck for the overall reforming capability is the maximum flow rate which can be processed by the primary reformer, for example the maximum flow rate through tubes of a shell-and-tube primary reformer, as well as the maximum flow rate acceptable by the gas-shift reactor and other downstream devices. Large equipments are expensive and then the mere provision of a larger primary reformer and/or larger downstream units is not a suitable solution to the above problem.

Many ammonia plants in the world operate according to the above disclosed process, having a front-end based on a single primary reformer with no secondary reformer, and comprising an air separation unit for the nitrogen feed. Hence, there is also the need of a cost-effective technique for the revamping of these existing ammonia plants. To this purpose, one should note that increasing the nominal flow rate of an existing reformer is generally not possible or would cause excessive pressure losses, and providing a new and larger reformer is generally too expensive. The same apply to the shift reactor and PSA device and, hence, the prior art does not provide an effective solution to this need.

SUMMARY OF THE INVENTION

The problem underlying the invention is to increase the output of an equipment for producing ammonia make-up syngas operating with the above disclosed process, for a given size and nominal flow rate of the primary reformer and the equipments for treating the syngas, such as the shift reactor and $CO_2$ removal unit.

The basic idea underlying the invention is to recover the $O_2$-enriched air stream delivered by the air separation unit, using said enriched air as oxidizer for an additional reformer which operates in parallel with the conventional primary reformer, receiving a portion of the total hydrocarbon input.

Accordingly, the aims of the invention are reached with a process for producing a makeup synthesis gas for the synthesis of ammonia, comprising the steps of:

reforming a hydrocarbon feedstock in a primary reformer obtaining a syngas stream, and treating said syngas stream obtaining a purified syngas containing hydrogen;

separating an air feed into a nitrogen stream and an oxygen-enriched air stream;

adding said nitrogen stream to the purified syngas, obtaining said makeup syngas containing hydrogen and nitrogen in a suitable molar ratio for synthesis of ammonia;

the process being characterized in that: said enriched air stream is fed to at least one additional reformer; a portion of the total hydrocarbon input of the process is reformed in the said additional reformer in parallel with the primary reformer, obtaining an additional syngas flow, and said additional syngas flow is joined with the syngas output of said primary reformer.

The primary reformer usually operates with steam. The additional reformer is preferably an autothermal reformer (ATR). The syngas output of the additional reformer is preferably cooled in a heat exchanger, for example a waste heat boiler, before it is merged with the syngas output of the primary reformer.

The $O_2$-enriched air stream can be compressed before the feeding to the additional reformer, if the pressure of said enriched air stream is lower than the working pressure of the additional reformer. The nitrogen stream is preferably pure nitrogen but, more generally, a nitrogen-rich stream can be used.

The hydrocarbon feed of the additional reformer, according to another aspect of the invention, can optionally be mixed with process steam and/or pre-heated in one or more heat recovery heat exchanger(s). In one embodiment, the hydrocarbon input flow is split into a portion directed to the primary reformer, and another portion directed to the additional reformer.

The treatment of the syngas subsequent to reforming is preferably carried out in a train comprising at least a shift converter and a PSA device downstream said shift converter, respectively to convert the CO contained in the syngas into $CO_2$ and then to remove the $CO_2$.

An object of the invention is also an equipment comprising: a primary reformer fed with a hydrocarbon flow and providing a syngas stream containing hydrogen; means adapted to eliminate impurities from said syngas stream and to obtain a purified syngas; an air separation unit separating an air feed into a nitrogen stream and an oxygen-enriched air stream; a flow line for mixing said nitrogen stream with the purified syngas, obtaining a makeup syngas containing hydrogen and nitrogen in a suitable molar ratio for the synthesis of ammonia, the plant being characterized by comprising at least one additional reformer in parallel with said primary reformer, said additional reformer receiving a hydrocarbon flow and said enriched air stream and producing a syngas output, and by comprising a flow line joining the syngas output of said additional reformer with the syngas output of the primary reformer.

The additional reformer, as stated above, is preferably an autothermal reformer, also referred to as ATR.

Said equipment can constitute, according to an aspect of the invention, the front-end section of an ammonia plant. The invention can also be implemented as a revamping method for existing ammonia plants and especially for a front-end of an ammonia plant with a reforming section based on a primary reformer with no secondary reformer.

A method for revamping the front-end of an ammonia plant, according to the invention, basically consist in: adding the additional reformer; providing appropriate means to feed the additional reformer with a portion of the total hydrocarbon input; providing means to feed said additional reformer also with the enriched air stream delivered by the ASU; providing further means to join the syngas output of the additional reformer with the syngas output of the primary reformer. Said appropriate means for feeding the hydrocarbon and enriched air to the additional reformer may include the necessary flow lines, valves, compressors and/or pre-heaters, as well as any auxiliary device known to a skilled person, according to the needs. The means for joining the output of the additional reformer with the output of the primary reformer may include a heat exchanger to recover heat from the syngas produced in the additional reformer, e.g. a waste heat boiler.

In particular, according to the invention, the front-end section of a plant for producing a makeup synthesis gas for the synthesis of ammonia comprising:
  a primary reformer fed with a hydrocarbon flow and providing a syngas stream containing hydrogen;
  means for eliminating impurities from said syngas stream,
  an air separation unit providing a nitrogen stream and an enriched air stream;
  means for mixing said nitrogen stream with the purified syngas, obtaining a makeup syngas containing hydrogen and nitrogen in a suitable molar ratio;
is revamped by performing at least the steps of:
  adding an additional reformer in parallel with said primary reformer,
  providing means to feed the enriched air stream delivered by said air separation unit to said additional reformer, and means to feed a portion of the hydrocarbon feedstock to said additional reformer,
  providing means to join the output of said additional reformer with the output of said primary reformer.

Further steps of the revamping method may include: providing at least a compressor to raise the pressure of the enriched air delivered by the air separation unit, up to the working pressure of the additional reformer, and means to feed the compressed enriched air stream to said additional reformer; providing at least a heat exchanger to cool down the syngas output of the additional reformer; providing means for mixing the hydrocarbon feed of the additional reformer with process steam and/or pre-heating said hydrocarbon feed.

The invention provides that the $O_2$-enriched air stream delivered by the air separation unit is used in a highly efficient way, for feeding a reformer operating in parallel with the primary reformer and adding reforming capability to the plant.

In the prior art this enriched air is seen substantially as a waste or by-product, and is vented to atmosphere, thus producing no useful effect, or used in a less efficient way, by feeding it to the primary reformer.

Hence, the main advantage achieved by the invention is to boost the reforming capability of the process and plant. A plant realized or revamped in accordance with the invention is able to receive a larger hydrocarbon input and then to deliver more make-up syngas than a corresponding prior-art installation, without increasing the duty of the primary reformer, and with a comparatively small increase of the duty of the section downstream the reformers.

The invention allows to realize new plants with increased reforming capability, and gives as well an effective way of boosting old ammonia installations, especially those based on a primary reformer, i.e. without a secondary reformer in series with the primary reformer.

Further advantages come from the use of the recovered $O_2$-enriched air in the additional reformer, instead of feeding said additional reformer with atmospheric air. Nitrogen is inert in the reforming stage, and the low nitrogen content of the $O_2$-enriched air means a smaller flow rate and less pressure losses, compared to operation with air. Moreover, compression of the enriched air require less energy than compression of an air feed, also because the enriched air is available from the air separation unit at a pressure greater than atmospheric.

The parallel operation of the additional reformer or ATR and the primary reformer gives the further advantage that the whole process is less sensitive to any fluctuation of one of said two reformers.

These advantages of the invention will be more evident with the help of the following description of preferred and non-limiting embodiments.

DETAILED DESCRIPTION OF A PREFERRED EMBODIMENT

Figure 1:
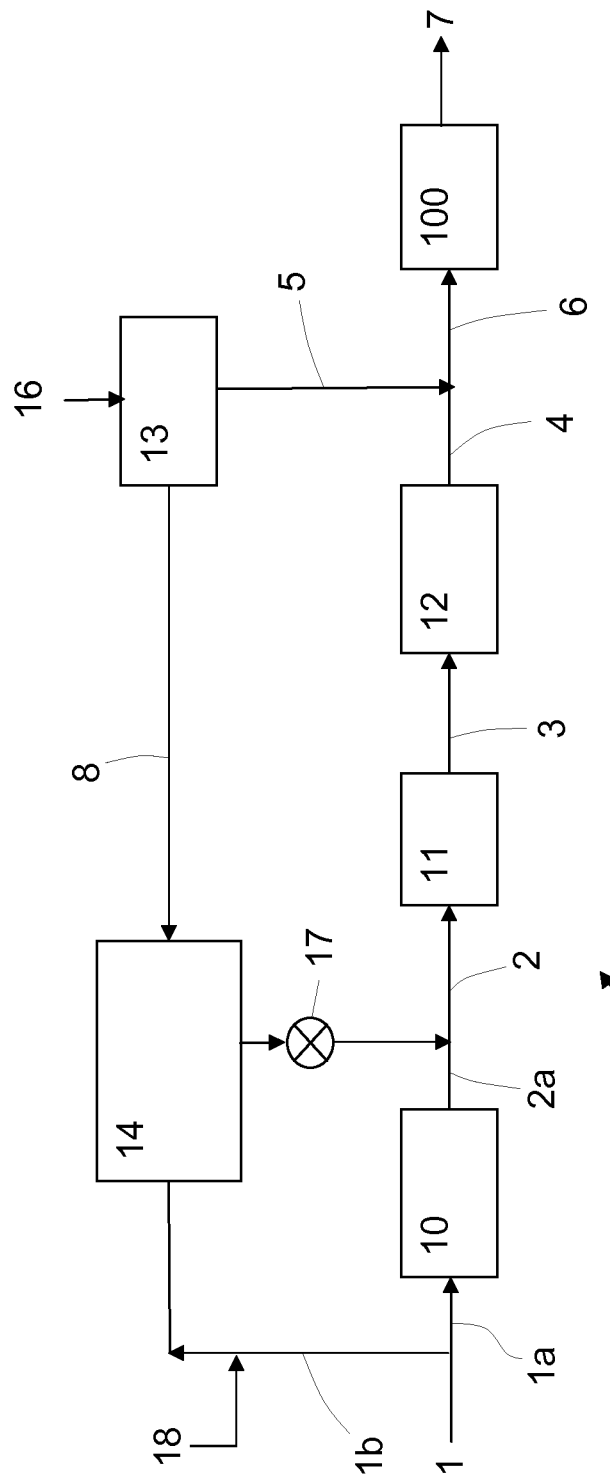
FIG. 1 is a block diagram of the front-end of an ammonia plant, according to the invention.

Referring to FIG. 1, a front-end 101 of an ammonia plant is fed with a natural gas flow 1 and delivers a make-up syngas 6 to an ammonia synthesis loop 100. Said loop 100 is a known technology, and produces an ammonia flow 7.

The front-end 101 comprises basically a primary steam reformer 10 and a downstream train of equipments for appropriately treating the reformed syngas, in the example a shift and gas-cooling section 11 and a PSA section 12.

The front-end 101 further comprises an air separation unit or ASU 13. Said ASU 13 separates an air input 16 into a nitrogen stream 5 and an $O_2$-enriched air stream 8. The nitrogen stream 5 is mixed with the purified syngas 4 obtained from the PSA section 12, to adjust the $H_2/N_2$ ratio of the stream 6 at the required value for the synthesis of ammonia in the loop 100.

The front-end 101 further comprises an additional reformer 14, preferably an autothermal reformer or ATR, which operates in parallel with the primary reformer 10.

The additional reformer 14 is fed with the enriched air stream 8 delivered by the ASU 13, and with a portion 1b of the total hydrocarbon feedstock 1, the other portion 1a of the same feedstock 1 being fed to the primary reformer 10.

The syngas produced in the additional reformer 14 is optionally cooled in a heat exchanger 17, e.g. a waste heat boiler, and the resulting output flow 9 is joined with the syngas output 2a delivered by the primary reformer 10. The stream 2 resulting from the outputs 2a and 9 of the reformers 10 and 14, respectively, is then directed to the shift and gas-cooling section 11.

The syngas stream 2 basically comprises hydrogen, residual hydrocarbons, steam, CO and $CO_2$, plus small amounts of impurities; the CO is converted to $CO_2$ in the shift section 11 and the gas is then cooled in the same section; the obtained stream 3 is fed to the PSA section 12 where $N_2$, $CO_2$ and the residual hydrocarbons are removed; the purified syngas 4 obtained from said PSA section 12 is added with the nitrogen 5 produced in the ASU unit 13, thus obtaining the make-up syngas 6 containing $H_2$ and $N_2$ in a 3:1 molar ratio, suitable for synthesis of ammonia ($NH_3$).

The pressure of the stream 8 can be raised in a suitable compressor (not shown) between the ASU 13 and the reformer 14.

The syngas portion 1b can optionally be mixed with process steam 18 and pre-heated before it enters the additional reformer 14, to improve the overall energy balance.

The invention is applicable to the revamping of a conventional front-end based on a primary reformer, comprising for example the reformer 10 fed with the available feedstock 1, the units 11 and 12 for purifying the syngas, and the ASU 13 to furnish the required nitrogen, where the enriched air stream 8 is originally vented to atmosphere or fed to the primary reformer 10.

In this case, the existing front-end is revamped at least by adding the additional reformer 14 and modifying the flow lines in order to feed this reformer 14 with a portion 1b of the total hydrocarbon feedstock, and with the enriched air 8. Further means are provided to join the syngas output 9 of said reformer 14 with the syngas output 2a of the primary reformer 10, possibly including the heat-recovery exchanger 17, and/or to pre-heat and mix the steam 18 with the input flow 1b of the reformer 14.

EXAMPLE

Figure 2:
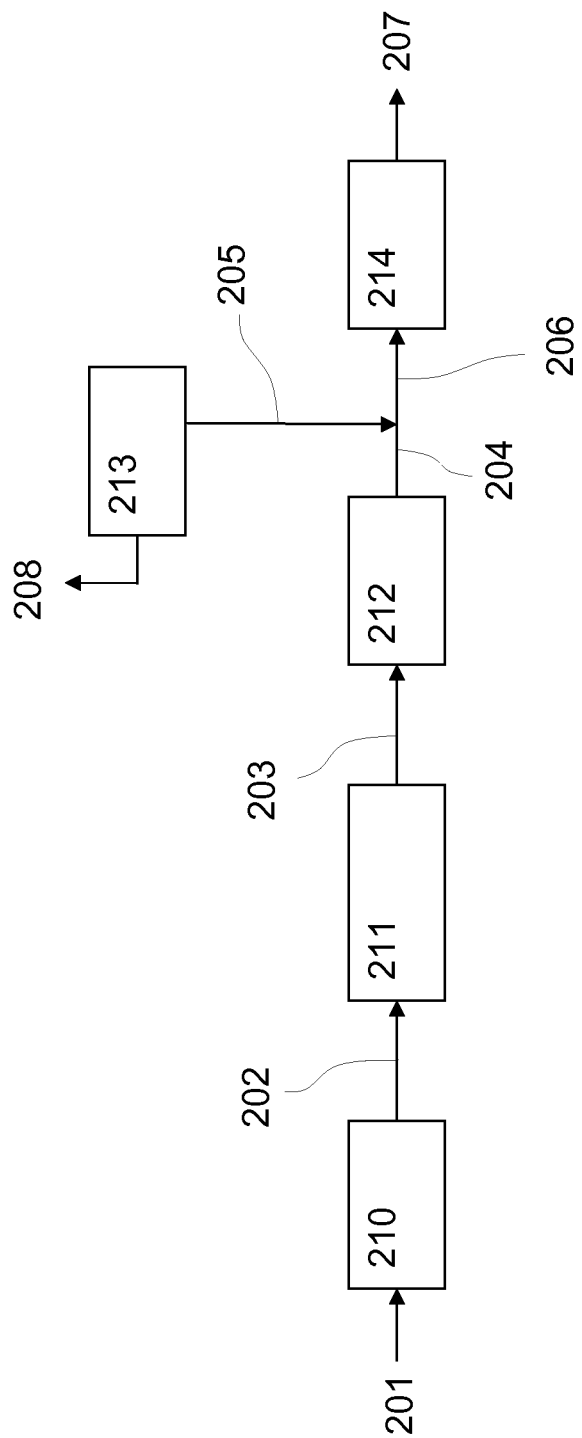
FIG. 2 is a block diagram of a prior-art layout of a front-end of an ammonia plant.

Table 1 is a material balance of a prior-art layout as in FIG. 2, where the front-end is fed with 15368 kg/h (i.e. around 4.27 kg/s) of natural gas, and the output is 25219.9 kg/h of ammonia syngas. Table 2 is the balance for the same plant revamped in accordance with FIG. 1, where total hydrocarbon input is increased to 21370 kg/h of natural gas, and the output is increased to 34414.1 kg/h of ammonia syngas. The reforming capability of the plant is augmented by more than 35% without the need to replace or boost the items 210 and 211. The Item 212 could require some modifications to make it suitable for the new capacity.

TABLE 1

| | | Stream | | | | | |
|---|---|---|---|---|---|---|---|
| | | 201 | 202 | 203 | 205 | 206 | 207 |
| Vapour Fraction (mole) | | 1.00 | 1.00 | 1.00 | 1.00 | 1.00 | 1.00 |
| Temperature | °C. | 27.2 | 245.2 | 30.7 | 33.4 | 30.8 | 23.0 |
| Pressure | Bar g | 30.59 | 22.55 | 20.83 | 22.31 | 20.38 | 8.33 |
| Molar Flow | kmole/hr | 802.5 | 4368.4 | 3350.5 | 740.0 | 2964.7 | 1469.9 |
| Mass Flow | kg/hr | 15368.0 | 56555.8 | 38239.7 | 20730.1 | 25219.9 | 25031.8 |
| Composition | % mol wet | | | | | | |
| $H_2$ | | — | 46.645% | 72.167% | — | 75.033% | — |
| $N_2$ | | 2.681% | 0.556% | 0.689% | 99.994% | 24.965% | — |
| $NH_3$ | | — | 0.001% | 0.025% | — | — | 100% |
| $CH_4$ | | 84.897% | 5.621% | 7.329% | — | — | — |
| Ar | | — | — | — | 0.006% | 0.001% | — |
| He | | — | — | — | — | — | — |
| $H_2O$ | | — | 32.155% | 0.232% | — | — | — |
| $O_2$ | | — | — | — | — | — | — |
| $CO_2$ | | 2.413% | 5.925% | 19.159% | — | — | — |
| CO | | — | 9.097% | 0.399% | — | — | — |
| Ethane | | 6.256% | — | — | — | — | — |
| Propane | | 2.681% | — | — | — | — | — |
| nButane, Pentane, Exane | | 1.072% | — | — | — | — | — |

TABLE 2

| | | Stream | | | | | | | |
|---|---|---|---|---|---|---|---|---|---|
| | | 1 | 2 | 3 | 5 | 6 | 7 | 8 | 9 |
| Vapour Fraction (mole) | | 1.00 | 1.00 | 1.00 | 1.00 | 1.00 | 0.00 | 1.00 | 1.00 |
| Temperature | °C. | 27.2 | 245.2 | 30.7 | 33.4 | 30.7 | 23.0 | 146.1 | 340.0 |
| Pressure | barg | 30.59 | 20.81 | 19.09 | 22.31 | 18.64 | 19.89 | 23.00 | 20.99 |
| Molar Flow | kmole/hr | 1116.0 | 6166.5 | 4683.5 | 1002.0 | 4022.6 | 1986.2 | 360.0 | 1962.4 |
| Mass Flow | kg/hr | 21370.0 | 85810.1 | 59120.3 | 28069.7 | 34414.1 | 33825.8 | 11206.0 | 31372.3 |
| Composition | % mol wet | | | | | | | | |
| $H_2$ | | 0.000% | 43.401% | 69.938% | 0.000% | 74.915% | 0.000% | 0.000% | 36.467% |
| $N_2$ | | 2.681% | 2.161% | 2.810% | 99.994% | 24.934% | 0.000% | 27.936% | 5.637% |
| $NH_3$ | | 0.000% | 0.000% | 0.024% | 0.000% | 0.000% | 100.000% | 0.000% | 0.000% |

TABLE 2-continued

| | Stream | | | | | | | |
|---|---|---|---|---|---|---|---|---|
| | 1 | 2 | 3 | 5 | 6 | 7 | 8 | 9 |
| $CH_4$ | 84.897% | 3.858% | 5.080% | 0.000% | 0.000% | 0.000% | 0.000% | 0.084% |
| Ar | 0.000% | 0.178% | 0.234% | 0.006% | 0.151% | 0.000% | 3.038% | 0.558% |
| He | 0.000% | 0.000% | 0.000% | 0.000% | 0.000% | 0.000% | 0.000% | 0.000% |
| $H_2O$ | 0.000% | 33.925% | 0.252% | 0.000% | 0.000% | 0.000% | 0.000% | 37.691% |
| $O_2$ | 0.000% | 0.000% | 0.000% | 0.000% | 0.000% | 0.000% | 69.026% | 0.000% |
| $CO_2$ | 2.413% | 6.365% | 21.252% | 0.000% | 0.000% | 0.000% | 0.000% | 7.292% |
| CO | 0.000% | 10.112% | 0.411% | 0.000% | 0.000% | 0.000% | 0.000% | 12.272% |
| Ethane | 6.256% | 0.000% | 0.000% | 0.000% | 0.000% | 0.000% | 0.000% | 0.000% |
| Propane | 2.681% | 0.000% | 0.000% | 0.000% | 0.000% | 0.000% | 0.000% | 0.000% |
| iButane | 0.357% | 0.000% | 0.000% | 0.000% | 0.000% | 0.000% | 0.000% | 0.000% |
| nButane | 0.536% | 0.000% | 0.000% | 0.000% | 0.000% | 0.000% | 0.000% | 0.000% |
| iPentane | 0.071% | 0.000% | 0.000% | 0.000% | 0.000% | 0.000% | 0.000% | 0.000% |
| nPentane | 0.071% | 0.000% | 0.000% | 0.000% | 0.000% | 0.000% | 0.000% | 0.000% |
| Exane | 0.036% | 0.000% | 0.000% | 0.000% | 0.000% | 0.000% | 0.000% | 0.000% |

The invention claimed is:

1. A process for producing a makeup synthesis gas for the synthesis of ammonia, comprising the steps of:
reforming a hydrocarbon feedstock in a primary reformer with no secondary reformer obtaining a syngas stream, and treating said syngas stream obtaining a purified syngas containing hydrogen;
separating an air feed into a nitrogen stream and an oxygen-enriched air stream;
adding said nitrogen stream to the purified syngas, obtaining a makeup syngas containing hydrogen and nitrogen in a suitable molar ratio for synthesis of ammonia;
wherein:
said oxygen-enriched air stream is fed to at least one additional reformer;
a portion of the total hydrocarbon input is reformed in said additional reformer in parallel with the primary reformer, obtaining an additional syngas flow, said additional syngas flow is joined with the syngas output of said primary reformer.

2. The process according to claim 1, wherein said additional reformer is an autothermal reformer ATR.

3. The process according to claim 1, wherein the syngas obtained from the additional reformer is cooled before it is joined with the syngas output of the primary reformer.

4. The process according to claim 1, wherein the enriched air stream is delivered by an air separation unit and compressed before it is fed to said additional reformer.

5. The process according to claim 1, wherein the hydrocarbon feed of the additional reformer is mixed with process steam and/or pre-heated in one or more heat recovery heat exchanger(s) before entering said additional reformer.

6. The process according to claim 1, wherein treatment of the reformed syngas is carried out in a shift converter and then in a PSA section, respectively to convert CO into $CO_2$ and to remove the $CO_2$, $N_2$ and residual hydrocarbons.

* * * * *